Nov. 28, 1950 J. W. BICKEL 2,532,053

CARD CASE FOR METER READERS

Filed March 9, 1948 2 Sheets-Sheet 1

Inventor:
Joseph W. Bickel.

By Brown, Jackson, Boettcher & Dienner

Attys.

Inventor:
Joseph W. Bickel.
By Brown, Jackson, Boettcher & Dienner
Att'ys.

Patented Nov. 28, 1950 2,532,053

UNITED STATES PATENT OFFICE 2,532,053

CARDCASE FOR METER READERS

Joseph W. Bickel, Sandusky, Ohio

Application March 9, 1948, Serial No. 13,857

7 Claims. (Cl. 281—44)

This invention relates, generally, to carrying cases and it has particular relation to cases for use by meter readers to carry a stack of generally rectangular tabulating cards.

It is becoming the practice to record the indication or reading of a meter, such as an electricity, gas or water meter, on a tabulating card, there being one card for each meter. Each card is marked by the meter reader with a pencil having a special lead, the marks being made in accordance with each of the meter dials and the suitable multiplying factor if any. In addition other factors are noted such as the demand indication, etc., if the same be used. The marked cards are processed in business machines which are adjusted and arranged to calculate the gross and net amounts due and to print a billing card with the address of the customer on it together with other necessary or desirable information. As indicated, the present invention has to do particularly with the case which is supplied to the meter reader for carrying the stack of tabulating cards.

In accordance with conventional practice, the meter reader visits each meter installation and makes the usual reading. He has a tabulating card for each meter on which is noted the name and address of the customer to which the meter is assigned. The meter reader arranges the cards in a stack in the order in which he intends to read the meters. In accordance with the present invention provision is made for placing the uppermost card on which the meter reading has been recorded at the bottom of the stack so that the uppermost card is the one corresponding to the next meter that is to be read.

Among the objects of this invention are: To provide a case for carrying a stack of generally rectangular tabulating cards for meter reading purposes which is arranged to facilitate the positioning of the uppermost card on which the meter reading has been marked at the bottom of the stack without removing the stack from the case; to carry the stack of cards in a case in such manner that the card corresponding to the next meter to be read will always be on top and at a position where it can be marked readily and easily; to provide a cover for the case which will be weatherproof; to construct the cover and mount it on the box so that a portion of it can serve as a handle which can be gripped by the meter reader for carrying the case and contents; to so position the point of connection between the cover and case that, when the handle is gripped, the cover tends to remain in the closed position; and to construct the case and cover so that, if necessary, it can be used to repel the attacks of dogs or other animals likely to be encountered by the meter reader in making his rounds.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the mature and scope of this invention, reference can be had to the following detailed description, taken together with the accompanying drawings, in which.

Figure 1:
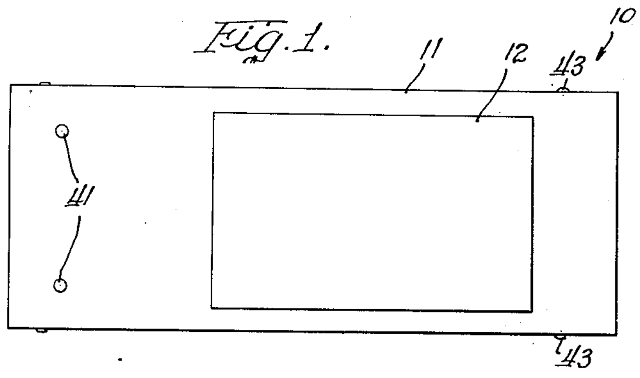
Figure 1 is a top plan view of a card case for meter readers constructed in accordance with this invention.
Figure 2:
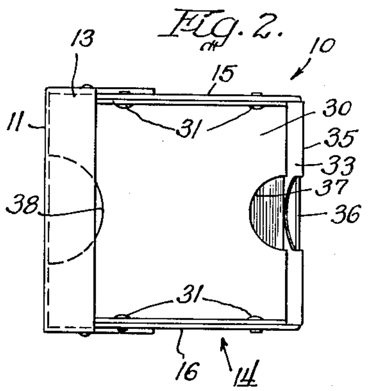
Figure 2 is a view, in end elevation, of the case shown in Figure 1.

Referring now particularly to the drawings, it will be noted that the reference character 10 designates, generally, a case for meter readers. The case 10 may be formed of light weight material such as aluminum. It includes a cover 11 which may have a card 12 secured on its upper surface for carrying certain identification if desired. The cover 11 also has a depending flange 13 around its periphery for overlying the upper edges of a generally rectangular box that is indicated, generally, at 14 to provide a weatherproof cover therefor. The box 14 includes side walls 15 and 16, an end wall 17 and a bottom 18. These portions of the box 14 preferably are integrally formed.

Figure 4:
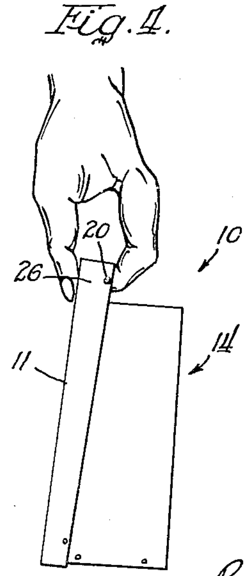
Figure 4 shows how the case can be carried by one hand of the meter reader.

The cover 11 may be hinged by rivets 20 to ears 21 which project rearwardly from a plate 22 that may be secured by rivets 23 to the end wall 17 along its upper edge. Each of the ears 21 has a semicircular opening 24 that, as shown more clearly in Figure 7, serves to permit entry of the adjacent flange 13 and to cooperate therewith for limiting the opening movement of the cover 11. A portion 25 of the flange 13 is folded back in order to facilitate gripping of the part 26 of the cover 11 which forms a handle for carrying the box 10 as shown in Figure 4. It will be understood that the folded back portion 25 permits the handle portion 26 of the cover 11 to be gripped by the fingers and to prevent slippage thereof when the box 10 and its contents are carried.

It will be observed that the plate 22 has a shelf 28 formed integrally therewith and projecting over the space enclosed by the walls and bottom of the box 14. The shelf 28 is provided to hold a stack 29 of tabulating cards within the box 14. It will be understood that the cards in the stack 29 are the conventional business machine tabulating machine cards which are specially prepared for use by the meter reader for recording the meter reading thereon and other information which may be required.

The stack 29 of tabulating cards also is held in place within the box 14 by a closure member 30 which is secured between the side walls 15 and 16 by rivets 31. The lower portion of the closure member 30 is spaced from the bottom 18 of the box 14 so as to provide an opening 32 through which the uppermost card of the stack 29 can be inserted on the bottom after the same has been marked. It is intended that the cards making up the stack 29 will be in a sufficient number so that the uppermost card lies immediately underneath the shelf 28 and thus can be marked readily and easily by the meter reader. By removing the marked card from the top and placing it at the bottom of the stack 29, the next card to be marked will always be uppermost and at convenient position for marking.

Figure 5:
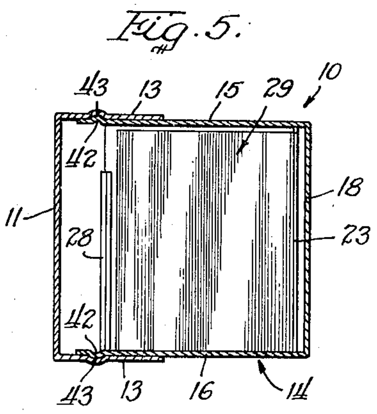
Figure 5 is a detail sectional view taken along the line 5—5 of Figure 3.
Figure 6:
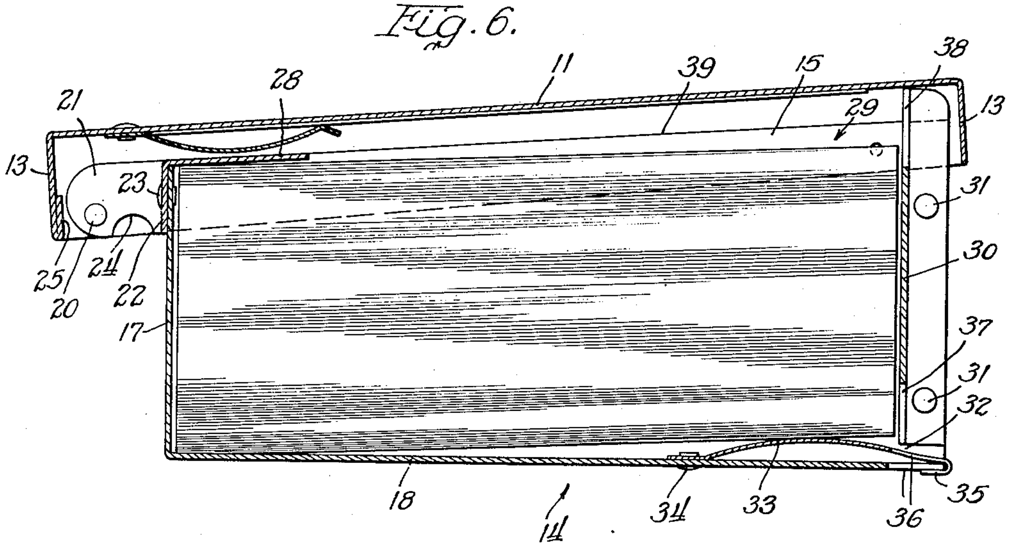
Figure 6 is a longitudinal sectional view of the case shown in the preceding figures.

With a view to facilitating the insertion of the marked card through the opening 32 a spacer 33 is provided on the bottom 18 and, as shown more clearly in Figures 5 and 6 of the drawings, is arranged to hold one end of the stack 29 of tabulating cards in spaced relationship to the bottom 18. The spacer 33 preferably is formed of resilient material and is bowed upwardly between its ends. One of its ends may be secured by rivets 34 to the bottom 18 of the box 14. The outer edge 35 is folded over the adjacent edge of the bottom 18 and is slidable with respect thereto as the spacer 33 springs downwardly or upwardly toward or away from the bottom 18. The bottom 18 and the spacer 33 have semicircular openings 36 which permit entry of the fingers of the meter reader to push the card containing the marking into position through the opening 32 and at the bottom of the stack 29. The upwardly curved portion of the spacer 33 adjacent the opening 32 serves as a throat to direct the marked card into the desired position. The lower edge of the closure member 30 also has a semicircular opening 37 which facilitates the movement of the marked card to the bottom of the stack 29.

Along its upper edge and centrally thereof the closure member 30 is provided with a semicircular opening 38 which permits ready access to the card at the top of the stack 29 which has been marked and facilitates its removal. If desired the semicircular opening 38 can be made deeper and if desired may approach the opening 37 to provide complete access to the ends of the cards in the stack 29.

It will be noted that the upper edges 39 of the side walls 15 and 16 are inclined upwardly from the left hand end of the box 14 as viewed in Figure 6. Likewise the shelf 28 is similarly inclined. The purpose of this is to have the upper edges 39 of the sides 15 and 16 approach parallelism with the cards in the stack 29 so as to facilitate marking of the same. It will be noted that the spacer 33 holds the stack 29 at an incline with respect to the bottom 18 and it is for this reason that the upper edges 39 are inclined as described.

Figure 3:
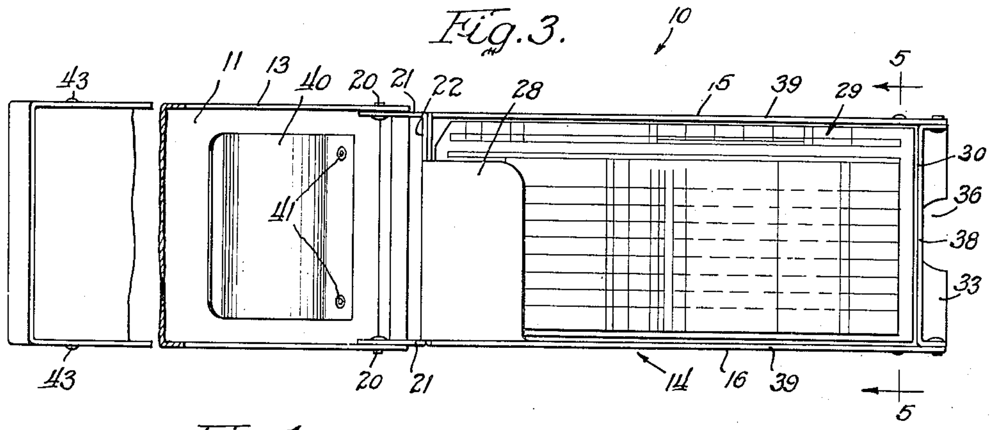
Figure 3 is a top plan view of the case shown in Figure 1 with the cover in the open position.
Figure 7:
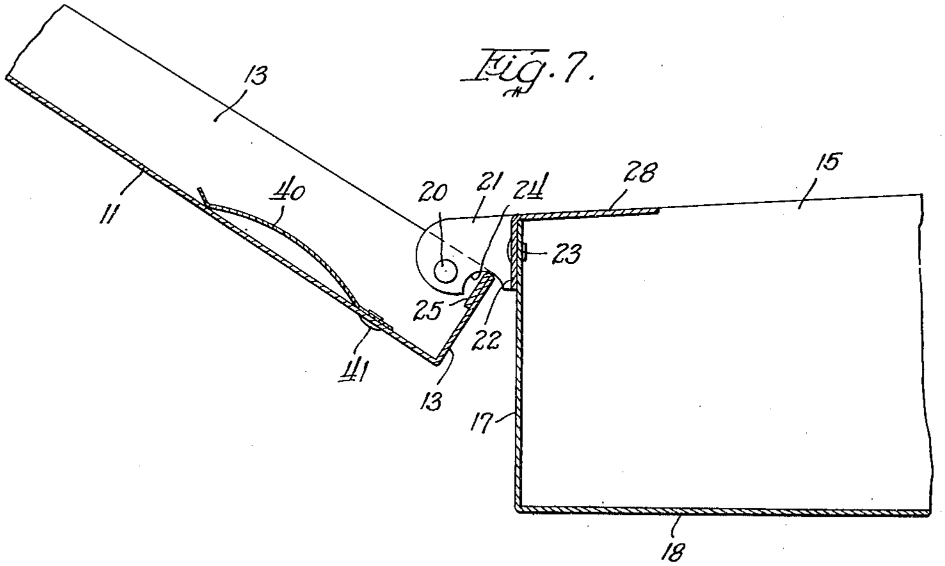
Figure 7 is a sectional view showing the cover in the open position and illustrating how it cooperates with ears projecting from the box to limit its opening movement.

Referring to Figures 3 and 7, it will be noted that a resilient strip 40 is secured by rivets 41 to the underside of the cover 11. The strip 40 is provided for holding certain cards of the stack 29 which the meter reader may wish to place therein. For example, if he is unable to read a particular meter, the card corresponding thereto may be placed under the strip 40.

Any suitable locking means can be provided for holding the cover 11 in closed position. As illustrated in Figure 5 the side walls 15 and 16 may be deformed to provide detents 42 which are arranged to cooperate with recesses 43 similarly formed in the depending flange 13 of the cover 11.

The cover 11 is hinged by the rivets 20 as illustrated in Figure 4 so that when the handle portion 26 is gripped by the hand, the box 10 and the stack 29 of cards is supported so that the cover 11 tends to be urged toward and held in the closed position. Thus even if the locking means comprising the detents 42 and recesses 43 were omitted, the cover 11 would be held closed when it is gripped as shown in Figure 4.

When the box 10 is filled with the stack 29 of tabulating cards, it forms a weapon with which the meter reader can defend himself from the attacks of dogs or other vicious animals that he is likely to encounter. While this use of the present invention, at first glance, might be considered to be unlikely, as a practical matter it has been found that it is extremely useful for such purpose. When constructed as described herein, the cover 11 is held closed when the case 10 is manipulated as a weapon so that the stack 29 of tabulating cards remains in place.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A meter reader's case for carrying rectangular tabulating cards to be marked by the meter reader in accordance with the meter indication, there being a card for each meter, comprising, in combination, a box for receiving a stack of said cards having an opening at the bottom of one end to permit insertion at the bottom of said stack of a marked card previously on the top thereof, and a spacer of resilient material at the bottom of said box adjacent said opening for holding the lowermost card of said stack in partial spaced relation to the juxtaposed wall forming the box bottom to facilitate insertion of said marked card, said resilient member being secured at its inner edge of the bottom wall of the box and having its outer edge folded around the adjacent outer edge of said bottom wall at the opening therein.

2. A meter reader's case for carrying rectangular tabulating cards to be marked by the meter reader in accordance with the meter indication, there being a card for each meter, comprising, in combination, a box for receiving a stack of said cards having an opening at the bottom of one end to permit insertion at the bottom of said stack of a marked card previously on the top thereof, and a cover for said box hinged to the top thereof at its other end, said cover having a portion projecting therefrom at the hinge end to provide a handle that can be gripped by the meter reader to carry the box and contents.

3. The invention, as set forth in claim 2, wherein the cover has a depending peripheral flange that extends below the top edges of the box to make the same weatherproof and the axis of the hinged connection to said box is positioned so that said cover is held closed when said box and cover are suspended from the handle of the latter.

4. The invention, as set forth in claim 3, wherein the cover is hinged to ears projecting from the box, said ears being recessed to accommodate the adjacent depending cover flange and cooperating therewith to provide a stop for limiting the opening movement of said cover.

5. The invention, as set forth in claim 2, wherein the cover has a depending peripheral flange extending below the top edges of the box to make the same weatherproof, the flange at the handle end being folded back on itself to facilitate gripping the same.

6. A card case comprising, a box having side walls the upper edges of which lie in a plane inclined from one end toward the other end thereof for receiving a stack of cards adapted to lie in inclined planes generally parallel to the plane in which said upper edges are disposed, a cover hinged adjacent said one end of said box at the top thereof, and a handle formed as a portion of said cover at the hinged end thereof, whereby said cover and said box are biased toward each other so that said cover closes said box when the case is suspended from its handle.

7. A card case comprising, a box having side walls the upper edges of which lie in a plane inclined from one end toward the other end thereof for receiving a stack of cards adapted to lie in inclined planes generally parallel to the plane in which said upper edges are disposed, said box having an opening at the bottom of said other end to permit insertion of cards at the bottom of said stack, a spring member at said other end of said box adjacent said opening for supporting the stack of cards in their aforesaid positions, said box having a shelf at the top thereof adjacent said one end, a cover hinged adjacent said one end of said box at the top thereof, and a handle formed as a portion of said cover at the hinged end thereof, whereby said cover and said box are biased toward each other so that said cover closes said box when the case is suspended from its handle.

JOSEPH W. BICKEL.

REFERENCES CITED

The following references are of record in the file of this patent:

UNITED STATES PATENTS

| Number | Name | Date |
|---|---|---|
| 335,435 | De Silva | Feb. 2, 1886 |
| 839,201 | Richter | Dec. 25, 1906 |
| 963,352 | Blackman | July 5, 1910 |
| 1,244,363 | Packard | Oct. 23, 1917 |
| 1,706,063 | Higgins | Mar. 19, 1929 |
| 1,935,311 | Cook | Nov. 14, 1933 |